United States Patent
Dechu et al.

(10) Patent No.: US 10,552,426 B2
(45) Date of Patent: Feb. 4, 2020

(54) ADAPTIVE CONVERSATIONAL DISAMBIGUATION SYSTEM

(71) Applicant: International Business Machines Corporation, Armonk, NY (US)

(72) Inventors: Sampath Dechu, Hyderabad (IN); Neelamadhav Gantayat, Bangalore (IN); Pratyush Kumar, Chennai (IN); Senthil Kumar Kumarasamy Mani, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 15/602,990

(22) Filed: May 23, 2017

(65) Prior Publication Data

US 2018/0341684 A1    Nov. 29, 2018

(51) Int. Cl.
| | |
|---|---|
| *G06F 17/30* | (2006.01) |
| *G06F 16/2457* | (2019.01) |
| *G06F 16/242* | (2019.01) |
| *G06F 16/901* | (2019.01) |
| *G06F 16/332* | (2019.01) |
| *G06F 16/33* | (2019.01) |

(Continued)

(52) U.S. Cl.
CPC ...... *G06F 16/24575* (2019.01); *G06F 16/243* (2019.01); *G06F 16/2425* (2019.01); *G06F 16/3329* (2019.01); *G06F 16/9024* (2019.01); *G06F 16/24522* (2019.01); *G06F 16/3344* (2019.01); *G06F 16/951* (2019.01)

(58) Field of Classification Search
CPC .............. G06F 16/3344; G06F 16/951; G06F 16/9535; G06F 16/243; G06F 16/24522; G06F 16/3329; G06F 17/278; G06F 16/3332; G06F 16/3334; G06F 17/27; G06F 16/2423; G06F 16/90332
USPC ......... 707/706, 722, 728, 732, 760, 765, 76, 707/776, 777
See application file for complete search history.

(56) References Cited

U.S. PATENT DOCUMENTS

| | | | |
|---|---|---|---|
| 7,711,672 B2 | 5/2010 | Au | |
| 8,326,603 B1 * | 12/2012 | Budzinski | G06F 17/27 704/9 |
| 9,171,542 B2 | 10/2015 | Gandrabur et al. | |

(Continued)

*Primary Examiner* — Dangelino N Gortayo
(74) *Attorney, Agent, or Firm* — Ference & Associates LLC (57) ABSTRACT

One embodiment provides a method, including: receiving a natural language query; selecting a disambiguation state model representing conversational dialog history, wherein the disambiguation state model comprises a plurality of nodes representing an entity, and a plurality of edges representing a path between two of the plurality of nodes, each of the plurality of edges including an assigned weight; traversing, the disambiguation state model using the natural language query to select a path to one of the plurality of nodes and providing the user the entity associated with the one of the plurality of nodes and iteratively selecting paths and nodes based upon input received from the user until a final node of the disambiguation state model is reached; providing a response to the natural language query based upon the entity of the final node; and updating the disambiguation state model based upon the traversed paths and nodes.

18 Claims, 3 Drawing Sheets

(51) Int. Cl.
 *G06F 16/2452* (2019.01)
 *G06F 16/951* (2019.01)

(56) References Cited

U.S. PATENT DOCUMENTS

| | | |
|---|---|---|
| 9,183,183 B2 | 11/2015 | Barve et al. |
| 9,286,386 B2 | 3/2016 | Johnston |
| 2004/0243568 A1 | 12/2004 | Wang et al. |
| 2005/0055321 A1 | 3/2005 | Fratkina et al. |
| 2006/0161560 A1* | 7/2006 | Khandelwal .......... G06F 16/951 |
| 2011/0289025 A1 | 11/2011 | Yan et al. |
| 2012/0131033 A1 | 5/2012 | Bierner |
| 2013/0110515 A1 | 5/2013 | Guzzoni et al. |
| 2014/0059030 A1* | 2/2014 | Hakkani-Tur ...... G06F 17/2818 707/706 |
| 2014/0278413 A1 | 9/2014 | Pitschel et al. |
| 2015/0227619 A1* | 8/2015 | Xie ....................... G06F 16/951 707/706 |
| 2015/0379013 A1* | 12/2015 | Purcell ................ G06F 16/3329 707/708 |
| 2016/0188571 A1* | 6/2016 | Daniel ................ G06F 16/9024 704/9 |
| 2016/0203237 A1* | 7/2016 | Whitnah ................ G06Q 10/10 707/722 |
| 2016/0306791 A1* | 10/2016 | Allen .................. G06F 16/3329 |
| 2018/0052884 A1* | 2/2018 | Kale ........................ G06N 5/04 |

\* cited by examiner

ADAPTIVE CONVERSATIONAL DISAMBIGUATION SYSTEM

BACKGROUND

Many companies and other entities employ automated conversational systems or agents to converse with other people. For example, a company may have an automated assistant that interacts with customers to provide answers to the customer's queries. The conversational system is intended to converse with the person in a coherent and natural language structure. Accordingly, the conversational system appears to converse in a manner similar to how a person would converse. This allows the person to feel comfortable in the conversation and provide information as they would with another person. As the person provides input to the conversational system, the system provides responses based upon the input. Responses may include answers to user's queries, provision of links to possibly helpful resources, and the like.

BRIEF SUMMARY

In summary, one aspect of the invention provides a method, comprising: utilizing at least one processor to execute computer code that performs the steps of: receiving, from a user, a natural language query; selecting a disambiguation state model representing conversational dialogue history corresponding to the natural language query, wherein the disambiguation state model comprises a plurality of nodes, each of the plurality of nodes representing an entity, and a plurality of edges, each of the plurality of edges representing a path between two of the plurality of nodes and each of the plurality of edges including an assigned weight corresponding to a traversal count; traversing, in response to the natural language query, the disambiguation state model, wherein traversing comprises using the natural language query to select a path to one of the plurality of nodes and providing the user the entity associated with the one of the plurality of nodes and iteratively selecting paths and nodes based upon input received from the user, in response to the provided entities, until a final node of the disambiguation state model is reached; providing a response to the natural language query based upon the entity of the final node; and updating the disambiguation state model based upon the traversed paths and nodes.

Another aspect of the invention provides an apparatus, comprising: at least one processor; and a computer readable storage medium having computer readable program code embodied therewith and executable by the at least one processor, the computer readable program code comprising: computer readable program code that receives, from a user, a natural language query; computer readable program code that selects a disambiguation state model representing conversational dialogue history corresponding to the natural language query, wherein the disambiguation state model comprises a plurality of nodes, each of the plurality of nodes representing an entity, and a plurality of edges, each of the plurality of edges representing a path between two of the plurality of nodes and each of the plurality of edges including an assigned weight corresponding to a traversal count; computer readable program code that traverses, in response to the natural language query, the disambiguation state model, wherein traversing comprises using the natural language query to select a path to one of the plurality of nodes and providing the user the entity associated with the one of the plurality of nodes and iteratively selecting paths and nodes based upon input received from the user, in response to the provided entities, until a final node of the disambiguation state model is reached; computer readable program code that provides a response to the natural language query based upon the entity of the final node; and computer readable program code that updates the disambiguation state model based upon the traversed paths and nodes.

An additional aspect of the invention provides a computer program product, comprising: a computer readable storage medium having computer readable program code embodied therewith, the computer readable program code executable by a processor and comprising: computer readable program code that receives, from a user, a natural language query; computer readable program code that selects a disambiguation state model representing conversational dialogue history corresponding to the natural language query, wherein the disambiguation state model comprises a plurality of nodes, each of the plurality of nodes representing an entity, and a plurality of edges, each of the plurality of edges representing a path between two of the plurality of nodes and each of the plurality of edges including an assigned weight corresponding to a traversal count; computer readable program code that traverses, in response to the natural language query, the disambiguation state model, wherein traversing comprises using the natural language query to select a path to one of the plurality of nodes and providing the user the entity associated with the one of the plurality of nodes and iteratively selecting paths and nodes based upon input received from the user, in response to the provided entities, until a final node of the disambiguation state model is reached; computer readable program code that provides a response to the natural language query based upon the entity of the final node; and computer readable program code that updates the disambiguation state model based upon the traversed paths and nodes.

A further aspect of the invention provides a method, comprising: utilizing at least one processor to execute computer code that performs the steps of: receiving, from a user, a query; accessing a directed acyclic graph corresponding to the received query, wherein the directed acyclic graph comprises entities related to the received query and edges connecting at least two entities representing disambiguation paths and wherein each of the edges are assigned a weight; traversing the directed acyclic graph by selecting paths from one entity to another entity based upon a user response to each provided entity and wherein the selecting paths is based, at least in part, on the weight assigned to a possible path until a final entity is reached; updating, based upon the traversing, the directed acyclic graph by updating the weights assigned to the paths; and providing, to the user, a response to the query using the final entity.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

One problem with typical conversational systems is that the system is merely structured to traverse different responses. In other words, if the user input matches or includes a particular phrase, the system will always provide the same response. For example, the system may parse the input provided by the user and select key phrases or words from the input. The system may then do a search in accessible databases for references that may apply to the key phrases or words. However, if the references do not help the user, the user has to provide additional input designating such, and the system then performs another search. The system does not learn when a response is not responsive or helpful to the user.

The typical conversational systems are based upon a knowledge graph in which knowledge sources are mapped to user intents. Thus, when the traditional system receives a user query that includes a key word or phrase (referred to herein as an entity for ease of readability) that maps to the user intent, the system provides the information included in the mapped knowledge source. However, the mapping of the entities to the user intents remains static. In other words, if the system identifies an entity as being included in the query, the mapped user intent will always be the same, resulting in provision of the same knowledge sources. Thus, if the user does not provide an accurate query, the system may never provide the user with the information the user actually desires. Additionally, the knowledge graphs and mappings do not update based upon user feedback. In other words, if a user provides an indication that the information was not helpful, the system does not store this feedback to optimize the knowledge graphs.

Accordingly, an embodiment provides a method of disambiguating a user intent using a disambiguation state model. The system may receive a natural language query from a user, similar to a traditional conversational system. The system may then select a disambiguation state model that is associated with or corresponds to the natural language query. The disambiguation state model may represent conversational dialogue history that has been obtained through other user queries corresponding to the selected disambiguation state model. The disambiguation state model may include a plurality of nodes which represent different entities. Entities in the context of this document may correspond to any possible response provided by the conversational system. For example, an entity may include a question, knowledge source (e.g., website link, reference material, file, document, etc.), a response to a user input, and the like. The disambiguation state model may also include a plurality of edges that represent paths between two entities. Each of these edges may also include an assigned weight corresponding to a traversal count.

The system may then traverse the disambiguation state model in response to the query. Traversing the model may include selecting a first path based upon the query. For example, if a user requests a particular reference, the system may select a path to the reference or a path to a question related to the query. Once the path is selected the system may provide the entity of the connected node to the user. Using the example above, depending on the path chosen, the system may provide the reference or the question. The system may then wait for additional user input related to the provided entity. Based upon this input, the system may select a new path leading from the provided entity node. This provision of entities, receipt of user input related to the provided entity, and selecting a path to a new entity may iteratively continue until a final node is reached. The final node may correspond to the identified user intent based upon the traversed paths and nodes. Alternatively, if the system fails to identify the user intent, the final node may include a failed node representing a final user whose intent could not be identified.

Once the final node has been reached, the system may provide a response to the query. In the case of a failed final node, the response may be that the system could not identify the user intent and requests the user to start over or provide different details. In the case of a successful disambiguation of the user intent, the response may include an answer to the query, provision of a desired reference, instructions in response to a request, or the like. Additionally, upon reaching the final node, the system may update the disambiguation state model. Updating the model may include updating the weights of the paths included in the model. The weight of a path used during the traversal may increase, while the weight of a path not used during the model traversal may decrease. If a path weight falls below a predetermined threshold, the path and any nodes relying solely on that path may be removed from the model. Thus, the model becomes more accurate and quick at disambiguating the user intent with fewer path and node options.

Such a system provides a technical improvement over current conversational systems in that such a system is more accurate and quick. The system and methods as described herein try to discern user intent in association with the user query, rather than merely using parsed text from the query to search a response. Thus, upon receiving a similar subsequent query, the system may more quickly and accurately identify the intent of the user. Additionally, rather than providing static responses to a query having a predetermined pattern or substance, the systems and methods as described herein provide an adaptive model that is updated based upon conversations with many different users. Accordingly, the system learns from the conversations in order to provide better or more useful responses to subsequent users having the same or similar query.

Figure 1:
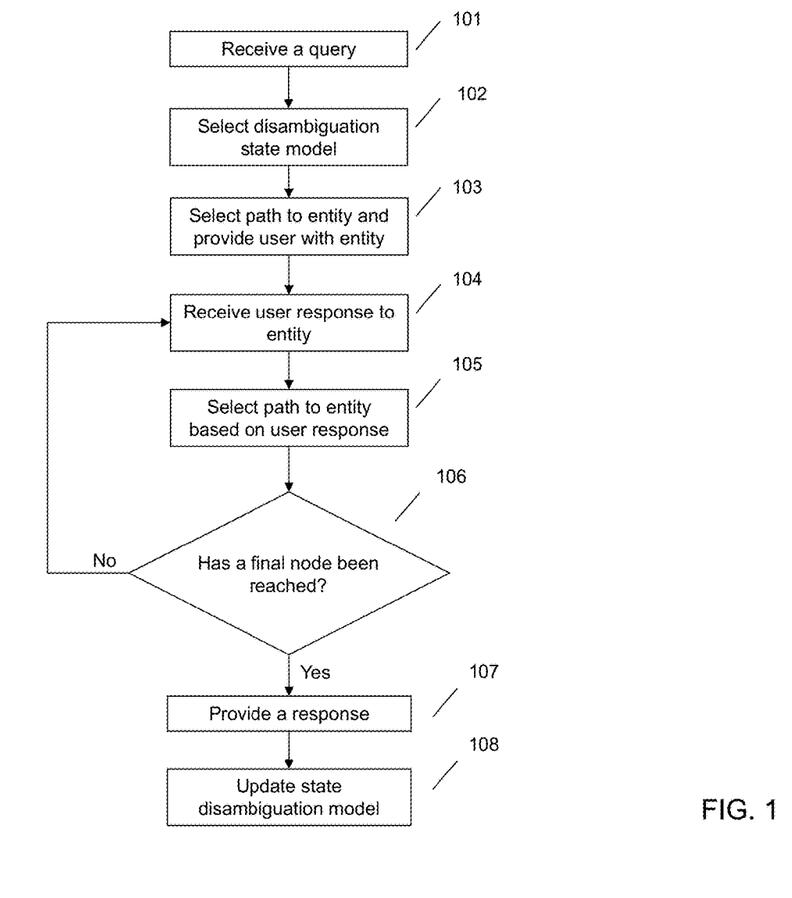
FIG. 1 illustrates a method of disambiguating a user query by traversing a disambiguation state model.
Figure 2:
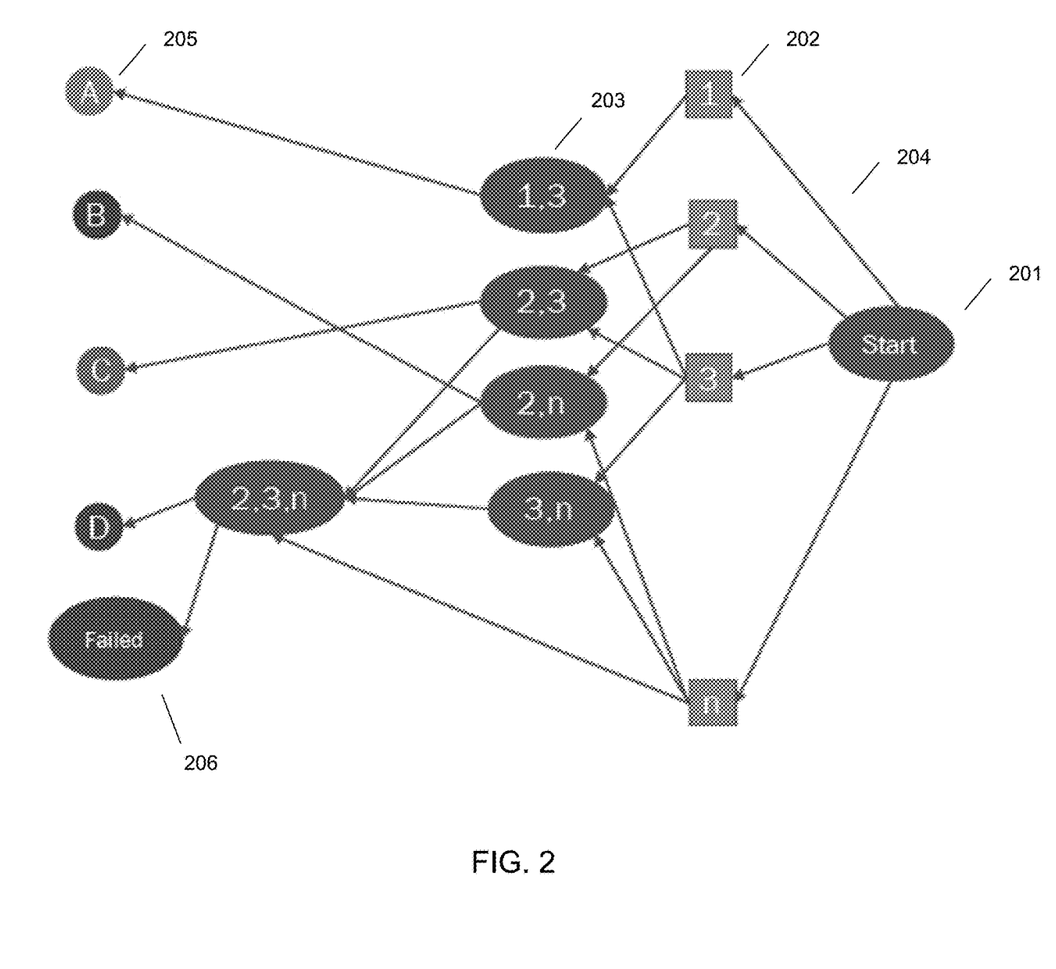
FIG. 2 illustrates an example disambiguation state model.

Referring now to FIG. 1, at 101, the system may receive from a user a natural language query. The query may include a question, request for information, statement to perform an action, and the like. In other words, the query may include any type of input that one user may provide to another user. Although typically provided in a full and complete sentence, the natural language query may be provided as a complete sentence, a phrase, or a selection of keywords or phrases. Additionally, if the system has access to other resources, the natural language query may include a reference to something else. For example, a user may provide a query referencing an entry in the user's calendar or files.

Based upon the query, the system, at 102, may select a disambiguation state model. The disambiguation state model may be, for example, a direct acyclic graph or other directed graph. The disambiguation state model may represent a conversational dialogue history that corresponds to the query. In other words, the disambiguation state model may have been generated or adapted based upon past conversations with the same or other users having the same or similar query. In this way, the selected disambiguation state model will correspond or be related to the query provided by the user. The disambiguation state model that is selected may be based, at least in part, on attributes or a profile of the user providing the query. For example, if the system identifies that a user is working with particular computer system, the model may be selected to correspond to that computer system. As another example, if the system identifies that the user only has access to particular applications, the model may be selected based upon the accessible applications. Other attributes of the user may be used to select the state model, for example, location of the user, previous query history of the user, role of the user, and the like.

The disambiguation state model may include a plurality of nodes and edges. Each of the nodes may represent a different entity that can be provided by the conversational system. In other words, a node may represent a response that can be provided by the system. These responses may include questions, knowledge sources, statements, requests for additional information, and the like. The edges of the model or graph may represent a path between two nodes. In other words, a path may connect two nodes and indicate which nodes can be directly accessed from another node. For example, referring to FIG. 2, the Start node 201 represents the user query. The square nodes 202 represent entities that can be provided by the system. The oval nodes 203 represent user responses to the provided entities. The arrows 204 represent paths between different nodes. The circle nodes 205 and the Failed node 206 represent final nodes, which are discussed in more detail below. From each node the system may have more than one option as designated by the paths. In other words, from one node the system may traverse different paths to reach different entities.

Each of the edges may have an assigned weight which corresponds or is directly related to a traversal count. The weight may identify the historical validity of recommending the path modelled by the edge. The higher the weight, the higher the confidence is in recommending the path. In other words, if in past conversations, the system has identified a path as resulting in a positive outcome, the weight of that path may increase as opposed to paths which result in a negative outcome. The weight may be computed based upon the traversal count which may represent the total number of dialogs that have traversed the associated path. This number may be proportional or normalized against the other paths within the model. For example, if one path is traversed in the dialog twice as many times as another path, the weight of the first path may be twice as much as the second path.

The proportionality or normalization of the paths may be based upon the position of the path within the model. For example, all the paths leading from one level of nodes to another level of nodes may be proportional to each other, whereas the paths leading from the second level of nodes to the next level of nodes may be proportional to each other. Additionally, the paths may be proportional or weighted based upon the starting node. As an example, if one node has three paths leading from it to three other nodes, the three paths may be weighted among themselves as opposed to against all the other paths within the model.

At steps 103-106 the system may traverse the selected disambiguation state model in response to the natural language query. Traversing the model may include selecting a path, based upon the user query, to an entity and providing the user with the selected entity at 103. Using the example of FIG. 2, the system may select a path from the Start node 201 to an entity node 202. For the sake of example, let us assume that entity node 3 is selected and provided to the user. The system may then receive a user input in response to the provided entity at 104. Let us assume that the user response corresponds to the user response node 2, 3. The system may then select a path to another entity based upon the user response at 105.

The system may determine if this new entity is a final node at 106. If a final node has not been reached, the system may continue traversing the model based upon iteratively selecting paths, providing the entity, receiving user input in response to the entity until a final node is reached. Traversing the model may be based at least in part on queries provided by other users. For example, the weight of the path may determine which path is selected and the weight, as discussed above, may be based upon the number of times that path has been traversed in response to other queries. If the final node, for example, 205 or 206 in FIG. 2, has been reached at 106, the system may provide a response to the user at 107.

The response may be based upon the contents or entity of the final node. For example, a final node may represent a suggested user intent associated with the original query. This identified intent may be based upon the paths and nodes that were traversed during traversal of the model. The final node may represent a final response to the query. For example, the final node may include the ultimate answer to the user's query, a link to the requested location, and the like. The final node may also have a confidence score associated with it. The confidence score may identify a level of confidence that the final node is actually responsive to the query or identifies the actual user intent. For example, a final node having a 60% confidence score may indicate that the system is 60% confident that the selected final node is the user's intent. As shown in FIG. 2, the final node may also include a Failed node 206. The Failed node may represent the system being unable to determine the user's intent. This node may request that the user provide additional detail or restart the query.

Additionally, the system may update the disambiguation state model based upon the traversal at 108. Updating the model may include updating the weights assigned to paths within the model. Updating the weights may include increasing, for example, proportionally or normalized, the weights for paths that were selected during the traversal and decreasing the weights for paths that were not selected during the traversal. In other words, weights do not have to be updated for only the paths that were selected or used during the traversal. In some cases, if the weight of a path falls below a predetermined threshold the path may be removed from the model. For example, if a path is seldom or never traversed during dialogues, the path may be removed. If a node is solely dependent on a removed path, the node may also be removed. In other words, if the only connection for a node within the model is a path that is removed, the node may also be removed. This allows the model to contain only the most relevant and up-to-date paths and models, thereby decreasing traversal time.

Updating the disambiguation state model may include updating the model in real-time. For example, if a large volume of users are calling into a helpline having a conversational agent or accessing a chat window for a digital assistant with similar problems, the state model may update the responses given to subsequent users based upon knowledge gleaned from the preceding conversations. As an example, if users are accessing a conversational system having issues with logging into a particular system, for a first group of users the system may provide responses to the users regarding whether the user remembers his/her password. However, after the system has traversed the state model and has identified that the users are having problems with a particular system and not with the passwords, when subsequent users access the conversational system with the same query, the system may not ask about the user's password and may simply notify the user that the system is experiencing an error.

Figure 3:
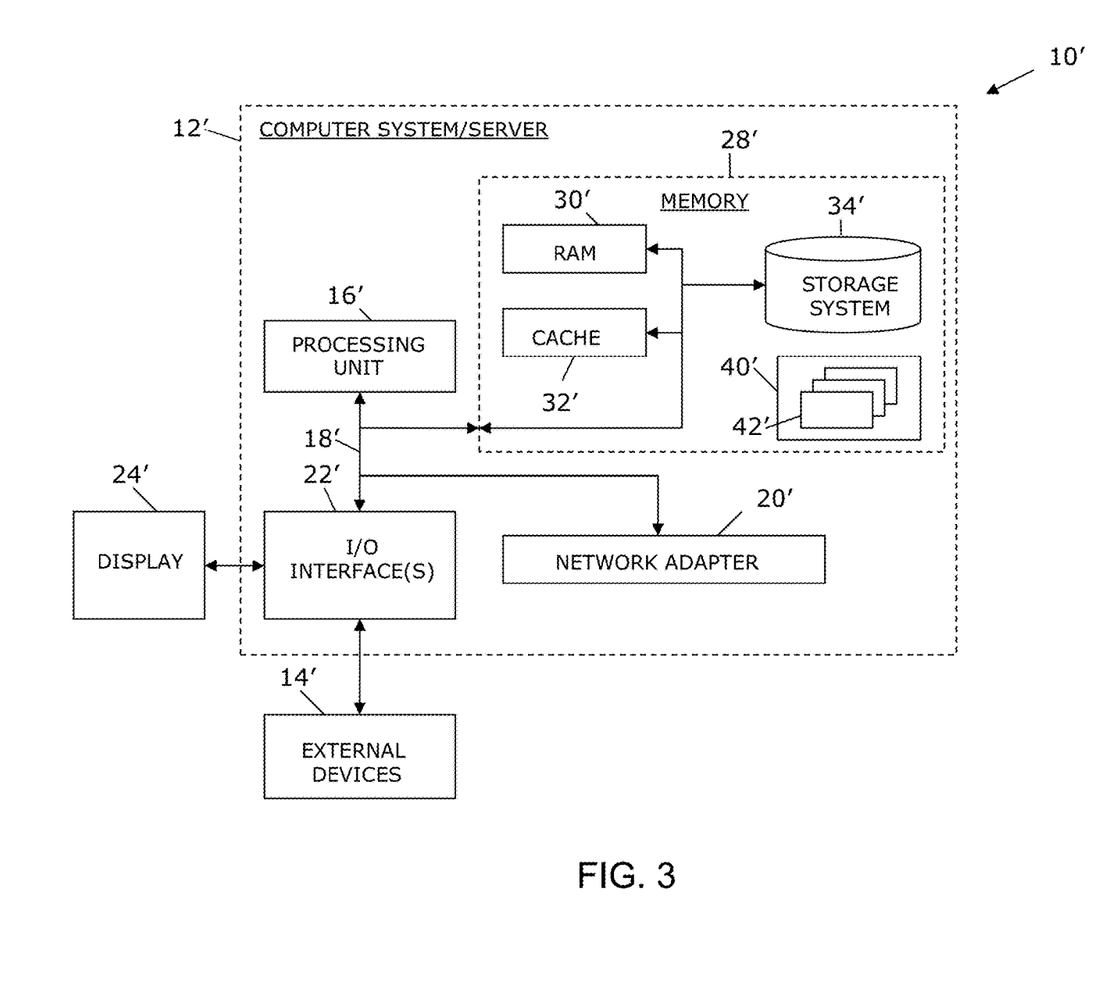
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving, from a user and at a conversational system, a natural language query;
selecting a disambiguation state model representing conversational dialogue history corresponding to the natural language query, wherein the selecting is based at least in part on attributes of the user, wherein the disambiguation state model comprises (i) a plurality of nodes, each of the plurality of nodes representing an entity, the entity representing a response that can be provided by the conversational system, and (ii) a plurality of edges, each of the plurality of edges representing a path between two of the plurality of nodes and each of the plurality of edges including an assigned weight corresponding to a traversal count, wherein the traversal count identifies the total number of historical dialogs corresponding to historical conversational dialogues that have traversed the path represented by the edge and wherein the assigned weight of the edge is higher based upon a higher traversal count and is based upon weights of other edges within the same level of the edge in the disambiguation state model;
traversing, in response to the natural language query, the disambiguation state model, wherein the traversing comprises (i) using the natural language query to select a path to one of the plurality of nodes, (ii) providing the user the entity associated with the one of the plurality of nodes, and (iii) iteratively selecting paths and nodes based upon input received from the user, in response to the provided entities, until a final node of the disambiguation state model is reached;
providing, from the conversational system, a response to the natural language query based upon the entity of the final node; and
updating the disambiguation state model based upon the traversed paths and nodes.

2. The method of claim 1, wherein the updating the disambiguation state model comprises updating the weight assigned to a path.

3. The method of claim 2, wherein the updating a weight comprises decreasing the weight of a path not selected during the traversing and increasing the weight of a path selected during the traversing.

4. The method of claim 2, wherein the updating the disambiguation state model comprises removing paths when the weight assigned to the path falls below a predetermined threshold.

5. The method of claim 1, wherein the final node comprises a suggested user intent associated with the natural language query.

6. The method of claim 1, wherein the attributes of a user are based upon a user profile of the user.

7. The method of claim 1, comprising identifying a confidence score associated with the final node, wherein the confidence score identifies a level of confidence that the final node is responsive to the natural language query.

8. The method of claim 1, wherein the paths and entities selected during the traversing are based, at least in part, upon natural language queries provided by other users.

9. The method of claim 1, wherein the weights assigned to paths are normalized within the disambiguation state model.

10. An apparatus, comprising:
at least one processor; and
a computer readable storage medium having computer readable program code embodied therewith and executable by the at least one processor, the computer readable program code comprising:
computer readable program code that receives, from a user and at a conversational system, a natural language query;
computer readable program code that selects a disambiguation state model representing conversational dialogue history corresponding to the natural language query, wherein the selecting is based at least in part on attributes of the user, wherein the disambiguation state model comprises (i) a plurality of nodes, each of the plurality of nodes representing an entity, the entity representing a response that can be provided by the conversational system, and (ii) a plurality of edges, each of the plurality of edges representing a path between two of the plurality of nodes and each of the plurality of edges including an assigned weight corresponding to a traversal count, wherein the traversal count identifies the total number of historical dialogs corresponding to historical conversational dialogues that have traversed the path represented by the edge and wherein the assigned weight of the edge is higher based upon a higher traversal count and is based upon weights of other edges within the same level of the edge in the disambiguation state model;
computer readable program code that traverses, in response to the natural language query, the disambiguation state model, wherein the traversing comprises (i) using the natural language query to select a path to one of the plurality of nodes, (ii) providing the user the entity associated with the one of the plurality of nodes, and (iii) iteratively selecting paths and nodes based upon input received from the user, in response to the provided entities, until a final node of the disambiguation state model is reached;
computer readable program code that provides, from the conversational system, a response to the natural language query based upon the entity of the final node; and
computer readable program code that updates the disambiguation state model based upon the traversed paths and nodes.

11. A computer program product, comprising:
a computer readable storage medium having computer readable program code embodied therewith, the computer readable program code executable by a processor and comprising:
computer readable program code that receives, from a user and at a conversational system, a natural language query;
computer readable program code that selects a disambiguation state model representing conversational dialogue history corresponding to the natural language query, wherein the selecting is based at least in part on attributes of the user, wherein the disambiguation state model comprises (i) a plurality of nodes, each of the plurality of nodes representing an entity, the entity representing a response that can be provided by the conversational system, and (ii) a plurality of edges, each of the plurality of edges representing a path between two of the plurality of nodes and each of the plurality of edges including an assigned weight corresponding to a traversal count, wherein the traversal count identifies the total number of historical dialogs corresponding to historical conversational dialogues that have traversed the path represented by the edge and wherein the assigned weight of the edge is higher based upon a higher traversal count and is based upon weights of other edges within the same level of the edge in the disambiguation state model;

computer readable program code that traverses, in response to the natural language query, the disambiguation state model, wherein the traversing comprises (i) using the natural language query to select a path to one of the plurality of nodes, (ii) providing the user the entity associated with the one of the plurality of nodes, and (iii) iteratively selecting paths and nodes based upon input received from the user, in response to the provided entities, until a final node of the disambiguation state model is reached;

computer readable program code that provides, from the conversational system, a response to the natural language query based upon the entity of the final node; and computer readable program code that updates the disambiguation state model based upon the traversed paths and nodes.

12. The computer program code of claim 11, wherein the updating the disambiguation state model comprises updating the weight assigned to a path.

13. The computer program code of claim 12, wherein the updating a weight comprises decreasing the weight of a path not selected during the traversing and increasing the weight of a path selected during the traversing.

14. The computer program code of claim 12, wherein the updating the disambiguation state model comprises removing paths when the weight assigned to the path falls below a predetermined threshold.

15. The computer program code of claim 11, wherein the final node comprises a suggested user intent associated with the natural language query.

16. The computer program code of claim 11, wherein the attributes of a user are based upon a user profile of the user.

17. The computer program code of claim 11, wherein the paths and entities selected during the traversing are based, at least in part, upon natural language queries provided by other users.

18. A method, comprising:

utilizing at least one processor to execute computer code that performs the steps of:

receiving, from a user and at a conversational system, a query;

accessing a directed acyclic graph corresponding to the received query, wherein the accessed directed acyclic graph comprises a directed acyclic graph based at least in part on attributes of the user, wherein the directed acyclic graph comprises entities related to the received query and edges connecting at least two entities representing disambiguation paths and wherein each of the edges are assigned a weight, wherein the entities represent a response that can be provided by the conversational system and wherein the weights of the edges are based upon (i) a total number of historical dialogues corresponding to historical conversational dialogues that have traversed the edge, wherein an assigned weight of an edge is higher based upon a higher total number of historical dialogues of the edge and (ii) weights of other edges within the same level of the edge in the directed acyclic graph;

traversing the directed acyclic graph by selecting paths from one entity to another entity based upon a user response to each provided entity and wherein the selecting paths is based, at least in part, on the weight assigned to a possible path until a final entity is reached;

updating, based upon the traversing, the directed acyclic graph by updating the weights assigned to the paths; and providing, to the user and from the conversational system, a response to the query using the final entity.

* * * * *